United States Patent [19]

Goode et al.

[11] Patent Number: 4,728,352
[45] Date of Patent: Mar. 1, 1988

[54] GLASS BATCH FEED ARRANGEMENT WITH DIRECTIONAL ADJUSTABILITY

[75] Inventors: Henry C. Goode, Decatur, Ill.; Wayne H. Gonzalez, Tumwater, Wash.; Steven H. Anderson, Mt. Zion, Ill.; Gary N. Hughes, Ross Township, Allegheny County; Donald P. Michelotti, Hampton Township, Allegheny County, both of Pa.

[73] Assignee: PPG Industries, Inc., Pittsburgh, Pa.

[21] Appl. No.: 914,414

[22] Filed: Oct. 2, 1986

[51] Int. Cl.⁴ .................................................. C03B 3/00
[52] U.S. Cl. .......................................... 65/27; 65/134; 65/335; 65/347
[58] Field of Search ................. 65/335, 347, 135, 136, 65/27, 134

[56] References Cited

U.S. PATENT DOCUMENTS

| | | | |
|---|---|---|---|
| 2,006,947 | 7/1935 | Ferguson | 49/53 |
| 2,007,755 | 7/1935 | Ferguson | 13/6 |
| 4,381,934 | 5/1983 | Kunkle et al. | 65/135 |
| 4,519,814 | 5/1985 | Demarest, Jr. | 65/27 |
| 4,529,428 | 7/1985 | Groetzinger | 65/27 |

*Primary Examiner*—Arthur Kellogg
*Attorney, Agent, or Firm*—Dennis G. Millman

[57] ABSTRACT

A pulverulent batch stream is fed into a liquefying vessel by means of an angled feed tube so as to direct the stream tangentially onto side wall portions. The tube may be rotated so as to change the location onto which the batch stream is impinged.

17 Claims, 6 Drawing Figures

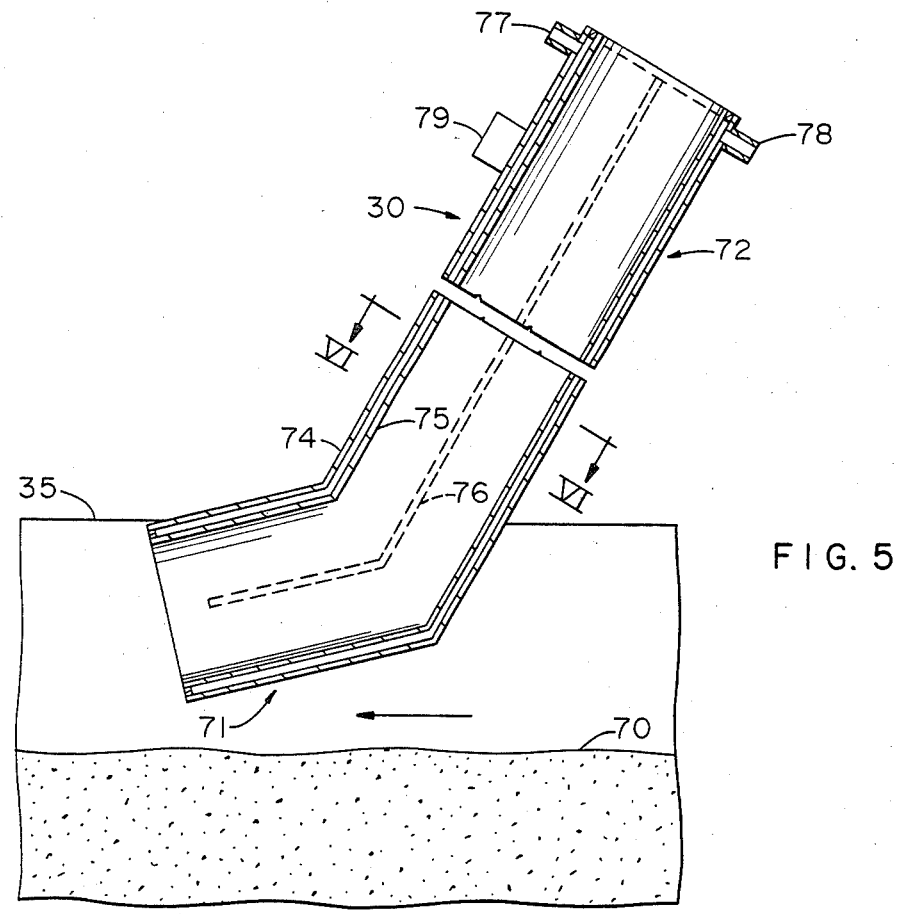
FIG. 5
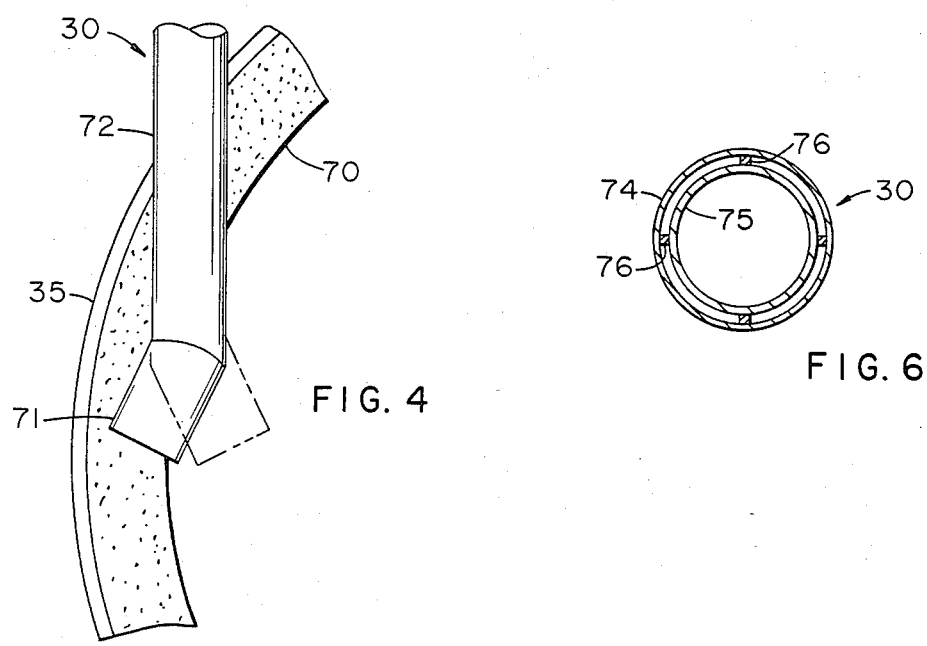
FIG. 4
FIG. 6

GLASS BATCH FEED ARRANGEMENT WITH DIRECTIONAL ADJUSTABILITY

BACKGROUND OF THE INVENTION

The present invention relates to controlling conditions within a chamber for converting pulverulent raw materials to a liquefied state as a discrete step in a melting process. The invention is generally applicable to processes that involve thermally converting a subdivided, essentially solid state feed material to an at least partially melted state. The invention is particularly applicable to initially liquefying a transient layer of the material supported by a stable layer of granular, thermally insulating, non-contaminating material, e.g., liquefying a layer of glass batch supported by a layer of material such as a granular batch constituent or glass batch.

U.S. Pat. No. 4,381,934 to Kunkle et al. teaches a method of converting particulate batch materials to a partially melted, liquefied state on a pulverulent support surface compatible with the batch material. As taught therein, the initial process of liquefying batch material is isolated from the remainder of the melting process and is carried out in a manner uniquely suited to the needs of the particular step, thereby permitting the liquefaction step to be carried out with considerable economies in energy consumption and equipment size and cost.

In a preferred embodiment of the Kunkle invention, a drum portion of the melting chamber is mounted for rotation so that batch fed into the chamber is held against chamber side walls by rotation of the drum to maintain a stable layer along the interior of the drum. Thermal energy is supplied to the drum interior so that the batch layer encircles the heat source. The liquefaction process is carried out by feeding batch into the drum through a stationary lid while rotating the drum and supplying heat to the drum interior to melt incoming batch material in a transient layer while an underlying layer of batch remains substantially stable and unmelted. As the material is liquefied, it flows downward toward an exit end of the rotating drum.

Central to the Kunkle method is the concept of employing a non-contaminating, thermally insulating layer of granular material (e.g., glass batch itself) as the support surface upon which liquefaction of glass batch takes place. A steady state condition may be maintained in the liquefaction chamber by distributing fresh batch onto a previously deposited batch surface at essentially the same rate at which the batch is melting, whereby a substantially stable batch layer will be maintained beneath a transient batch layer, and liquefaction is essentially confined to the transient layer. The partially melted batch of the transient layer runs off the surface while contacting substantially only a batch surface, thus avoiding contaminating contact with refractories. Because glass batch is a good heat insulator, providing the stable batch layer with sufficient thickness protects any underlying support structure from thermal deterioration.

During operation, the thickness of the lining fluctuates as portions melt away and are subsequently replenished. Some of these fluctuations may be merely momentary, but practical limitations on the ability to maintain perfectly steady state conditions sometimes results in the lining having significantly different thicknesses at different times. It is desirable to deposit incoming batch material onto a preselected portion of the lining, the location of which varies as the lining thickness changes. Therefore, the ability to adjust the batch feed orientation is desirable. One approach to this problem is disclosed in U.S. Pat. No. 4,529,428 (Groetzinger) in which a pivotable plate is used to deflect the incoming batch stream onto the appropriate portion of the lining. While this approach can be effective, it would be desirable to provide an arrangement that would be simpler in construction and would not entail sharp changes in the direction of the batch stream so as to minimize scattering of the batch and entrainment of finer particles in the combustion gas streams.

Batch feed chutes that direct batch toward side wall portions of rotating melters are shown in U.S. Pat. Nos. 2,006,947 and 2,007,755 (both Ferguson). In the former, the angle of the feed chute is shown with a tangential component. Neither provides adjustability to the location at which batch is deposited.

SUMMARY OF THE INVENTION

In the present invention pulverulent batch material is fed to a variable, predetermined location within a heated liquefaction vessel by means of a chute or tube rotatable about its longitudinal axis and having an angled tip portion. Rotating the chute or tube causes the discharge end of the angled tip portion to swing through an arc so that the batch discharge location may vary. Such an arrangement is advantageously simple in structure and avoids moving parts inside the heated vessel other than the feed chute or tube itself.

For feeding batch material to a rotating vessel, the preferred embodiment of the present invention provides the angled portion of the feeding means with an orientation that is substantially horizontal and substantially tangential to the rotation of the lining. Such an orientation results in batch being discharged with a direction of motion similar to that of the areas of the lining upon which it impinges. This reduces the changes in direction that the batch stream undergoes and results in less scattering and dusting of the batch.

The angled feed tube of the present invention also offers advantages apart from the variable feed location feature. The horizontal and tangential orientation of the batch stream at the point of discharge referred to above is beneficial even if the feed tube is not rotated. Because only the tip portion is angled toward the horizontal, the majority of the feed path may be sufficiently steep to assure free flow of material by gravity without substantial risk of plugging. The angled discharge end is sufficient to divert the batch stream to the desired discharge orientation but is short enough that the momentum of the stream carries the pulverulent material through that less sloped section without plugging.

THE DRAWINGS

FIG. 4 is a plan view of a portion of the liquefier vessel with the lid removed showing a preferred embodiment of the adjustable feed tube of the present invention.

FIG. 5 is an enlarged vertical cross-sectional view of the feed tube of FIG. 4.

FIG. 6 is a transverse cross-sectional view of the feed tube of FIG. 5 taken along line 6—6.

DETAILED DESCRIPTION

Although the invention is described herein in connection with a glassmaking operation, it should be apparent that the vitreous condition of the final product need not have an effect on the aspects of the process to which the present invention relates. Therefore, the present invention is not limited to processing glass batch, but encompasses processing any pulverulent material by preheating and liquefying. The product could be vitreous, partially vitreous, ceramic, or even metallic.

Figure 1:
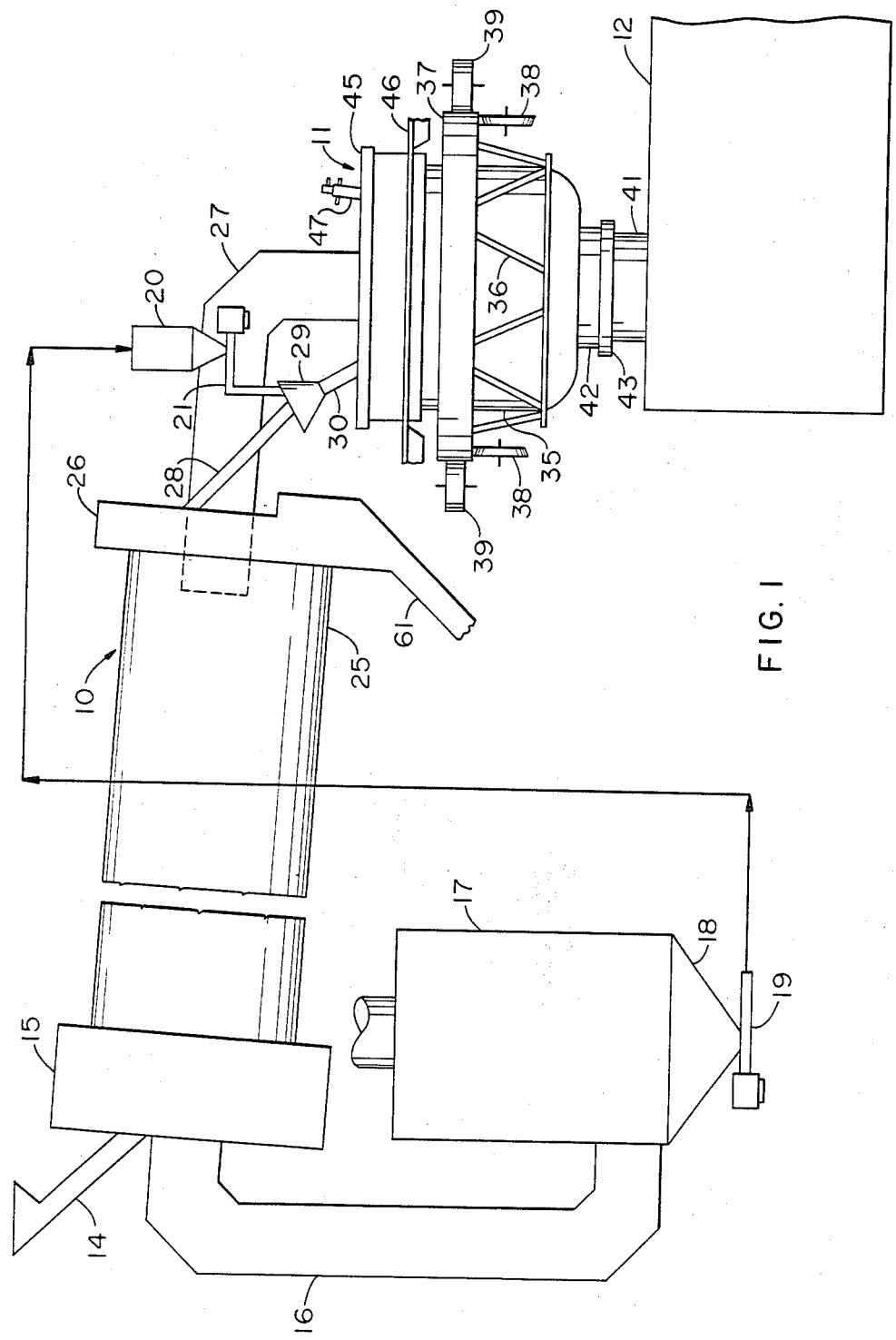
FIG. 1 is a side elevational view of a rotary kiln preheater and a rotary liquefying vessel interconnected with a preferred embodiment of the batch feeding arrangement of the present invention.

In FIG. 1 there is shown the overall arrangement of a rotary kiln 10 feeding batch material to and receiving exhaust gas from a liquefier vessel 11. A vessel 12 may be provided below the liquefier 11 to receive liquefied material for further processing if desired. Reference may be had to U.S. Pat. No. 4,519,814 (Demarest) for details of the construction and operation of the rotary kiln type of preheater and the liquefier vessel that are included in the preferred embodiment here. It should be understood that the particular constructions of the preheater and the liquefier are not critical to the present invention.

Raw materials such as pulverulent glass batch material are fed to the inlet end of the rotary kiln 10 through a delivery chute 14. The inlet end of the rotary kiln is enclosed by a stationary exhaust box 15 that directs exhaust gases leaving the rotary kiln to a duct 16 leading to a particulate separator 17. The use of a particulate separator is optional, depending upon the amount of entrained particles in the exhaust gas stream, and various types of particulate separators may be used. A preferred type is a bag separator in which the exhaust gas is passed through a plurality of heat resistant fabric bags that filter particles from the gas as is well known in the art. In this conventional separator apparatus, the bags are periodically agitated so that the accumulated particles may fall into a hopper portion 18 of the separator apparatus. The collected particulates may be disposed of in any suitable manner but it is preferred that the particulate materials be recirculated to the melting process. Thus in the embodiment shown in FIG. 1, the hopper 18 leads to a screw feeder 19 that conveys the material to a conveyor (shown schematically) such as a pneumatic conveying system. A novel, advantageous feature shown in connection with the preferred embodiment, that is the invention of another not the present inventor, is that the recycled particulates are fed directly to the liquefier 11 thus bypassing the preheating stage. In this connection, a bin 20 may be provided to receive the particulate material from the conveying system from which the material may be fed by a screw feeder 21 to the main batch feeding means for the liquefier.

With continued reference to FIG. 1, the preheater 10 may be configured as a conventional rotary kiln with an outer, cylindrical shell of steel 25, an insulating lining, and optionally an inner steel cylinder (not shown). The rotary kiln is mounted for rotation about its cylindrical axis at an angle slightly inclined from horizontal so as to convey the pulverulent material being heated from the inlet end toward the liquefier 11. The outlet end of the rotary kiln is enclosed by a stationary housing 26, and in this embodiment the transfer arrangement of the present invention is contained within the housing 26 which will be described in greater detail hereinafter. An exhaust duct 27 extends from the liquefier 11 into the rotary kiln 10 and conveys the products of combustion from the fuel burning heat sources in the liquefier into the preheater where heat from the waste gases is transferred to the batch material. A tube 28 carries the heated batch material from the preheater to the liquefier. The tube 28 is of sufficient length to accommodate the spacing of the preheater 10 away from the area above the liquefier 11 for the sake of accessibility, and the tube 28 is of sufficient slope to permit free flow of the batch material by gravity (preferably at least about 45°). The tube 28 may lead to a funnel 29 at which supplemental materials such as the recycled particulates may be added to the batch feed stream. The funnel 29, in turn, leads to an adjustable feed tube 30 extending into the liquefier 11, the details of which will be described herein in connection with FIGS. 4, 5, and 6.

The preferred liquefier embodiment is of the type disclosed in U.S. Pat. No. 4,381,934 (Kunkle et al), the disclosure of which is hereby incorporated by reference. The preferred embodiment is that in which a lining of batch material is maintained on the sidewalls and bottom portion of a steel drum 35 that is rotated about a substantially vertical axis. In the embodiment depicted, the drum 35 is supported by a plurality of rods 36 that are hung from a circular frame 37 mounted for rotation on a plurality of support rollers 38 and aligning rollers 39. A central opening in the bottom of a drum 35 permits liquefied material to flow freely from the liquefier into the receiving vessel 12. A stationary refractory collar 41 may be provided to enclose the falling stream. Also it is preferred that a seal be provided between the rotating portion of the liquefier and the stationary surrounding structures, such as by a rotating flange 42 affixed to the bottom of drum 35 extending into a water-containing, annular, stationary trough 43. The open upper end of drum 35 is covered by a stationary lid assembly 45, which may be constructed of ceramic refractory material or of water-cooled metal, and is supported on peripheral stationary frame members 46. The lid 45 may be provided with openings for insertion of one or more burners 47 for heating the interior of the liquefier. Preferably, a plurality of burners spaced around the periphery of the liquefier are employed. Batch material is deposited onto the lining within the liquefier, leaving a central cavity in which combustion from the burners takes place.

Figure 2:
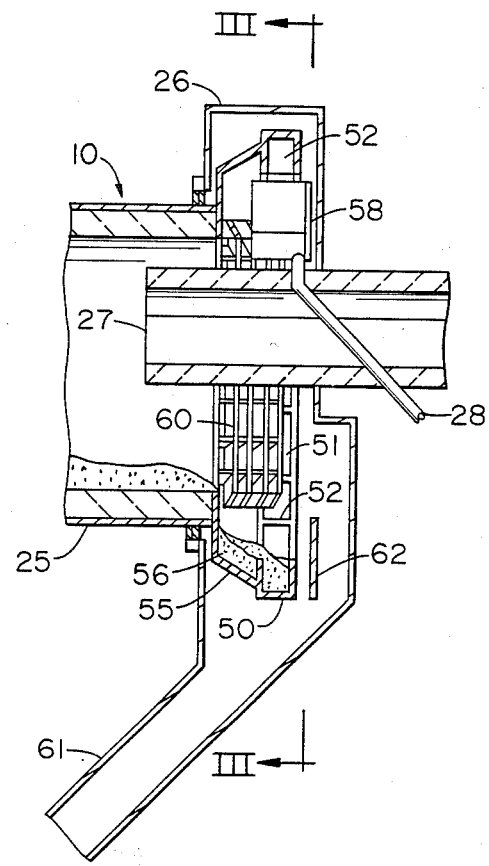
FIG. 2 is a vertical cross-section of the batch discharge end of the rotary kiln depicted in FIG. 1 showing batch elevator means in accordance with a preferred embodiment.
Figure 3:
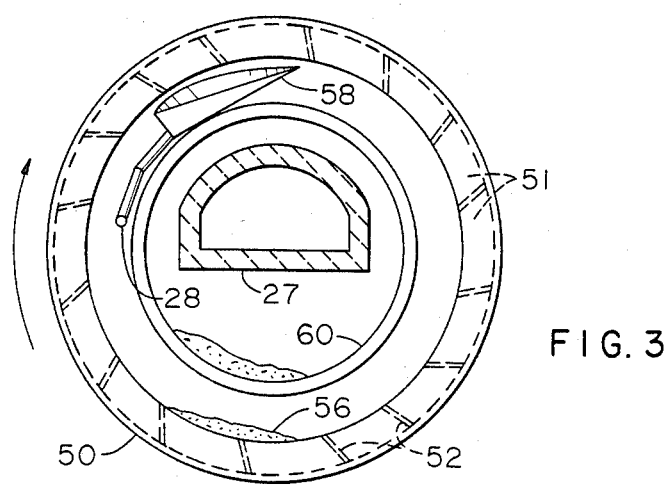
FIG. 3 is a vertical cross-section of the batch discharge end of the rotary kiln taken along line 3—3 in FIG. 2.

A preferred arrangement of a batch transfer mechanism may be seen in the cross-sectional view of the outlet end of the feeder shown in FIG. 2 and in the end view shown in FIG. 3. The basic feature of the batch transfer mechanism shown in FIG. 2 is a bucket elevator type arrangement affixed to the outlet end of the rotary kiln 10, whereby batch material is elevated to a sufficient height to flow by gravity down the tube 28 into which it is discharged. The tube 28 can be of any length dictated by the location in the liquefier to which the batch is to fed, as well as to accommodate the spacing between the preheater and the liquefier. The distance to which the batch travels through the tube 28 and the height to which the batch is elevated by the bucket elevator system are interrelated and are limited by the angle at which the material will flow freely by gravity. Although not preferred, additional length of travel could be achieved by means of auxiliary mechanical devices such as a screw feeder to convey the batch material horizontally during a portion of its travel from the preheater to the liquefier. The bucket elevator shown in FIGS. 2 and 3 is formed by a circular channel 50 opening radially inward toward the center line of the rotary kiln and compartmented into a plurality of bucket chambers 51 by means of a plurality of divider plates 52. The channel 50 is carried by a continuous flange 55 that spaces the channel axially and radially from the lip of the rotary kiln. The buckets are spaced radially outward from the lip of the rotary kiln so that the batch material exiting the rotary kiln falls freely into the buckets. The axial spacing of the buckets from the end of the rotary kiln is an optional feature intended to create a ledge onto which the batch material falling from the rotary kiln first falls before entering the buckets. The purpose of this feature is to reduce abrasive wear of the buckets by the impact of the pulverulent batch materials. The ledge area is designed to hold a portion of batch material 56 which, due to the lack of partitions in the ledge area, rides constantly in the bottom of the flange area. Thus, batch falling out of the rotary kiln lands on this retained portion of batch 56 rather than on the metal surfaces of the bucket elevator mechanism. In the embodiment depicted in FIG. 3, the bucket partitions 52 are angled so as to prevent discharge of the material until the material is carried to the upper portion of the apparatus. There, the material flows freely from the buckets into a receiving pan 58. To avoid interference with other elements of the apparatus, the bottom surface of the receiving pan 58 is shaped as a conical segment. The lower corner of the receiving pan 58 is provided with an opening to permit the material to flow into the tube 28.

An advantageous but optional feature shown in FIGS. 2 and 3 is a grate 60 at the discharge end of the rotary kiln 10. This grate is aligned with the inner surface of the rotary surface so that material passing from the rotary kiln to the buckets 51 must pass through the grate. Thus the grate serves to separate any unduly large agglomerations of material that may have formed within the rotary kiln. Any very large agglomerations that do not pass through the grate 60 will bypass the bucket elevator by being passed directly from the grate to a bypass discharge chute 61. A baffle plate 62 (FIG. 2) may be provided to assist in isolating the bypass chute pathway from the bucket elevator. Any surges of material from the rotary kiln that overflow the bucket elevator will also pass to the discharge chute 61.

FIGS. 4, 5, and 6 show details of a specific embodiment of feed tube 30 in accordance with the present invention. Referring to FIG. 4, looking down on an interior portion of the liquefier vessel, the drum 35 has a layer of pulverulent material 70 retained on the interior side thereof. This insulating layer 70 may fluctuate in thickness during operation and in order to deposit the incoming batch material onto the appropriate portion of the layer 70 adjustability of the orientation of the feed tube outlet is provided. In the embodiment shown, this adjustability is achieved by providing the feed tube 30 with an angled end portion 71. When the main portion 72 of the feed tube is rotated about its longitudinal axis, the angled tip portion 71 moves through an arc so the opening at the end of the feed tube can be aligned above different portions of the layer 70. Thus, a simple rotation of the feed tube portion outside the liquefier can alter the location at which the batch is discharged within the liquefier. It is generally desired to feed the batch material onto the uppermost portion of the vertical face of the lining 70. Feeding material too far toward the center beyond the batch layer can lead to undue entrainment of the batch material in the gas streams within the liquefier, and feeding the batch material onto the horizontal end surface of the lining 70 can lead to undue accumulation of batch along the upper rim of the drum 35.

As can be seen in FIG. 5, the angle on the angled tip portion 71 is provided with more of a horizontal component than the main feed tube portion 72 and the tip portion 71 is aimed in a direction substantially tangential to the movement of the adjacent portion of the layer 70 and drum 35. This orientation provides the batch material being discharged from the feed chute with momentum more consistent with that of the material within the rotating liquefier drum, thereby minimizing any scattering and dusting of the material when it lands on the moving layer 70. The main feed tube portion 72 may be mounted at a relatively steep angle sufficient to assure free flow of pulverulent material therethrough and to impart momentum to the batch stream so as to impact the lining or side wall portions within the liquefier. For dry glass batch an angle of 45° or greater from horizontal is usually considered adequate to assure flow, an angle of about 60° being preferred. The tip portion 71 is preferably substantially horizontal, i.e., it is at less of an angle from horizontal than the main portion 72, but need not be precisely horizontal. In fact, a slight downward angle may be preferred to shorten the trajectory of the batch falling onto the lining 70. An angle of about 20° or less from horizontal may be used for the tip portion orientation and is considered substantially horizontal. It should also be apparent that the preferred substantially tangential orientation of the tip portion 71 need not be precisely tangential, but may include a slight outward angle toward the drum wall 35. Of course, rotation of the feed tube in response to lining thickness changes will slightly alter the angular relationship of the tip portion 72 to its surroundings, but preferably without departing from the generally horizontal and tangential relationship.

Constructional details of the feed tube 30 may be seen in FIGS. 5 and 6. In order to withstand the high temperatures within the liquefying vessel, the tube is preferably provided with cooling means. The cooling arrangement of the embodiment shown in the drawings is provided with annular coolant passageways between an outer cylinder 74 and an inner cylinder 75. Partitions 76 may be provided within the annulus to establish multiple passes for the coolant. Fluid connections 77 and 78 may be provided for respectively supplying and draining the coolant, which is preferably water. As shown in FIG. 5, a radially extending tab 79 may be provided on the portion of the feed tube 30 outside the liquefier for purposes of attaching actuator means for rotating the tube by remote control. Any expedient arrangement may be employed to rotatably support the feed tube. For example, if automated adjustment of the tube is employed, a sleeve member (not shown) may be provided outside the vessel to loosely hold the tube. If manual adjustment is to be used, a simple champing arrangement could be provided.

Other variations and modification as would be known to those of skill in the art may be resorted to without departing from the scope of the invention as defined by the claims that follow.

We claim:

1. Apparatus for liquefying pulverulent material comprising a vessel mounted for rotation about a central axis, means for feeding pulverulent material onto interior side wall portions of the vessel, and means for heating the interior of the vessel so as to liquefy the pulverulent material, characterized by the means for feeding pulverulent material comprising an elongated housing defining a path for guiding pulverulent material from the exterior to the interior of the vessel, the housing including a longitudinal portion extending into the vessel at an angle having a substantial vertical component sufficient to permit flow of the pulverulent material by gravity and a lower end portion within the vessel extending from the longitudinal portion at a more horizontal angle relative to the longitudinal portion and oriented at a direction substantially tangential to the rotation of the most adjacent portion of the rotating vessel.

2. The apparatus of claim 1 wherein the longitudinal portion is mounted at an angle of at least 45° with respect to horizontal, and the lower end portion is oriented at an angle less than 45° from horizontal.

3. The apparatus of claim 2 wherein the vessel is mounted for rotation about a substantially vertical axis.

4. The apparatus of claim 2 wherein the lower end portion is substantially horizontal.

5. The apparatus of claim 1 wherein the lower end portion of the feeding means is at an angle to the longitudinal portion, and the longitudinal portion is mounted for rotation about its longitudinal axis so as to vary the orientation of the lower end portion.

6. The apparatus of claim 3 further including a stationary lid member covering an upper end of the vessel, the longitudinal portion of the feeding means extending through an opening in the lid member.

7. The apparatus of claim 6 further including an exhaust gas opening in the lid member spaced from the feeding means opening.

8. Apparatus for liquefying pulverulent material comprising a vessel having a lining of pulverulent material on interior side wall portions, means for feeding additional pulverulent material onto the lining, means for heating the interior of the vessel so as to liquefy portions of the pulverulent material, characterized by the means for feeding additional material comprising an elongated housing defining a path for guiding the material from the exterior to the interior of the vessel, the housing including a longitudinal portion extending into the vessel at a first angle and a discharge end portion within the vessel extending from the longitudinal portion at a second angle, the housing being mounted for rotation about the longitudinal axis of the longitudinal portion of the housing so as to alter the feed location within the vessel.

9. The apparatus of claim 8 wherein the lower end portion of the housing extends from the longitudinal portion in a direction having a horizontal component substantially parallel to the most adjacent area of the side wall of the vessel.

10. The apparatus of claim 9 wherein the vessel is mounted for rotation about a substantially vertical axis, and the lower end portion of the feeding means housing extends from the longitudinal portion in a direction having a component substantially parallel to the tangential velocity of the most adjacent portion of the vessel side wall.

11. The apparatus of claim 8 wherein the housing is tubular in configuration and is provided with cooling means.

12. The apparatus of claim 8 wherein the vessel is mounted for rotation about a substantially vertical axis, further including a stationary lid member covering an upper end of the vessel, the longitudinal portion of the feeding means extending through an opening in the lid member.

13. The apparatus of claim 12 further including an exhaust gas opening in the lid member spaced from the feeding means opening.

14. A method of feeding glass batch material to a heating vessel in which a lining is rotated about a central cavity, comprising guiding a stream of batch material into the vessel along a first path having a substantial vertical component sufficient to permit flow of the batch material by gravity, changing the direction of the batch stream after entry into the vessel to a more horizontal direction so that the batch stream is directed onto the lining along a second path substantially parallel to the tangential velocity of an adjacent portion of the lining.

15. The method of claim 14 wherein the thickness of the lining changes and the orientation of the batch stream is changed in response thereto.

16. The method of claim 14 wherein the vessel is rotated about a substantially vertical axis, the first batch path is at an angle of at least 45° from horizontal, and the second batch path is less than 45° from horizontal.

17. The method of claim 16 wherein the second batch path is substantially horizontal.

* * * * *